United States Patent
Cluet et al.

(10) Patent No.: US 12,370,932 B2
(45) Date of Patent: Jul. 29, 2025

(54) SUPPORT ELEMENT FOR A VEHICLE SEAT, ASSOCIATED VEHICLE SEAT AND ASSEMBLY METHOD

(71) Applicant: FAURECIA SIÈGES D'AUTOMOBILE, Nanterre (ER)

(72) Inventors: Mathieu Cluet, Etampes (FR); Fabrice Charras, Montrouge (FR); Cesar Knusmann, Issy les Moulineaux (FR); Marc Thiel, Hericourt (FR)

(73) Assignee: Faurecia Sièges d'Automobile, Nanterre (FR)

( * ) Notice: Subject to any disclaimer, the term of this patent is extended or adjusted under 35 U.S.C. 154(b) by 107 days.

(21) Appl. No.: 18/188,246

(22) Filed: Mar. 22, 2023

(65) Prior Publication Data
US 2023/0302975 A1  Sep. 28, 2023

(30) Foreign Application Priority Data
Mar. 22, 2022 (FR) ................ FR 22 02496

(51) Int. Cl.
*B60N 2/58* (2006.01)
*B60N 2/68* (2006.01)

(52) U.S. Cl.
CPC .......... *B60N 2/5816* (2013.01); *B60N 2/686* (2013.01)

(58) Field of Classification Search
CPC .... B60N 2/5883; B60N 2/5858; B60N 2/609; B60N 2/6063; B60N 2/2881; B60N 2/5816; B60N 2/6016; B62J 1/20
See application file for complete search history.

(56) References Cited

U.S. PATENT DOCUMENTS

| | | | | |
|---|---|---|---|---|
| 2003/0042773 | A1* | 3/2003 | Stiller | B60N 2/5816 297/218.3 |
| 2017/0088026 | A1* | 3/2017 | Patterson | B60N 2/914 |
| 2023/0322136 | A1* | 10/2023 | Wang | B60N 2/5825 297/452.18 |

FOREIGN PATENT DOCUMENTS

| | | | | |
|---|---|---|---|---|
| DE | 4118396 | C1 | 9/1992 | |
| DE | 202011002719 | U1 * | 6/2011 | B60N 2/5825 |
| DE | 202012012450 | U1 | 7/2013 | |
| EP | 2233351 | A1 * | 9/2010 | B60N 2/60 |
| FR | 2836906 | A1 | 9/2003 | |

OTHER PUBLICATIONS

French Search Report corresponding to application FR 2202496, dated Oct. 25, 2022, 2 pages.

* cited by examiner

*Primary Examiner* — Timothy J Brindley
(74) *Attorney, Agent, or Firm* — Reising Ethington P.C.

(57) ABSTRACT

A support element for a vehicle seat, the support element including: a shell, a cover mounted on the shell, the cover defining a front surface for receiving a passenger, and a rear surface opposite the front surface, and a padding arranged between the shell and the cover. The cover has a plurality of fastening loops fastened on the rear surface of the cover. The shell has a plurality of through-openings arranged substantially facing the fastening loops, the fastening loops passing through the through-openings and mechanically cooperating with the shell so as to keep the cover rigidly connected to the shell.

15 Claims, 6 Drawing Sheets

[Fig 1]
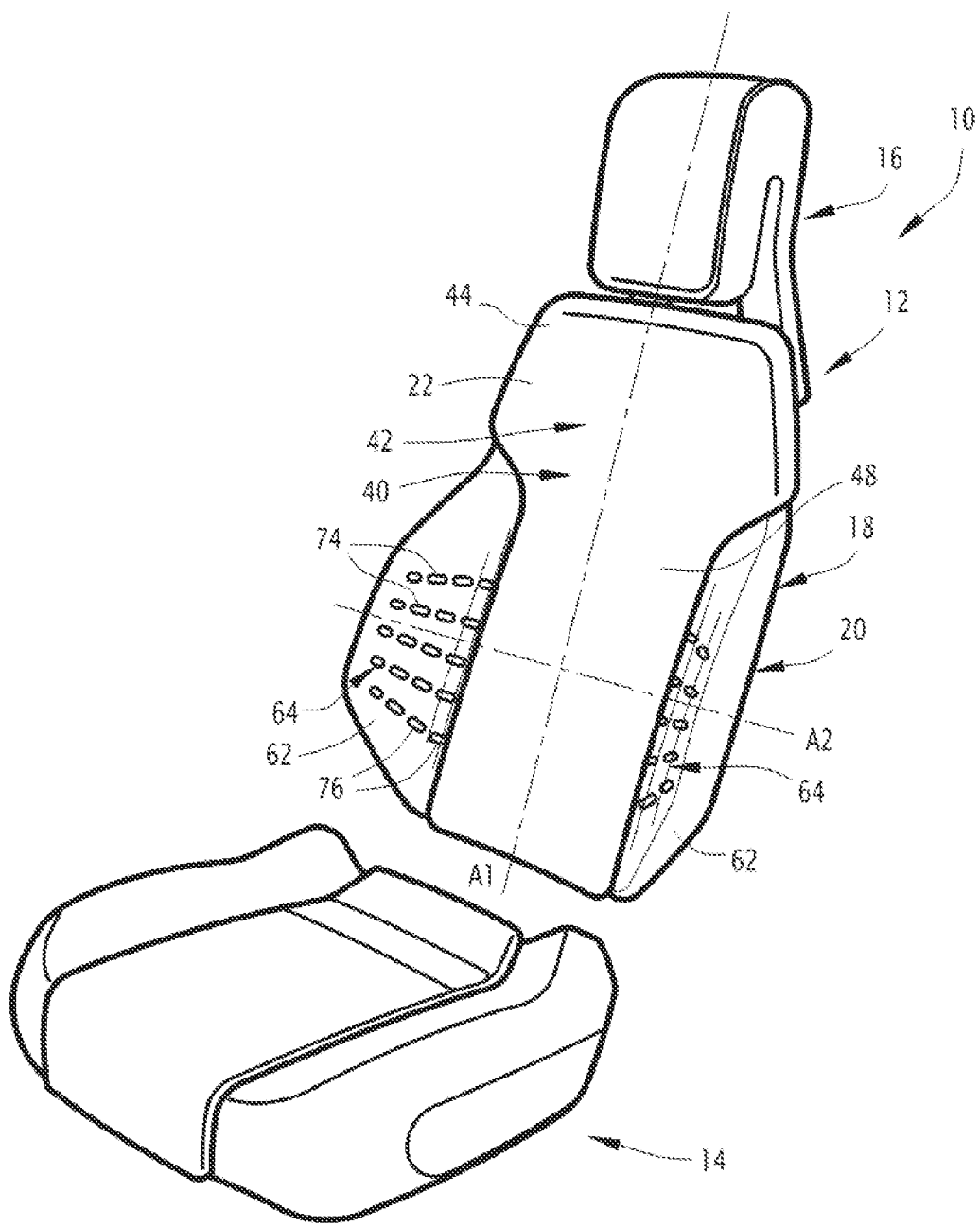

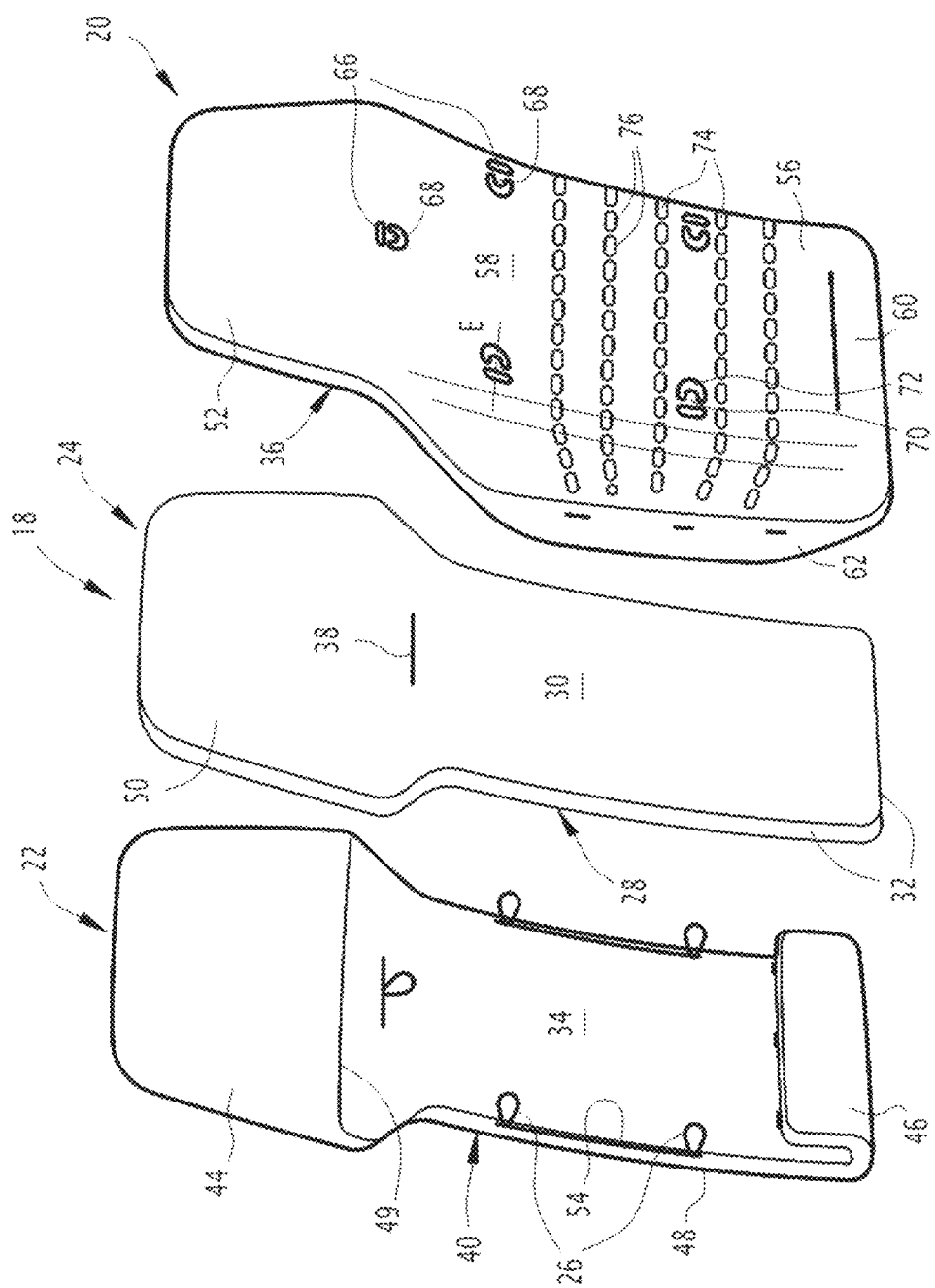
[Fig 2]

[Fig 3]
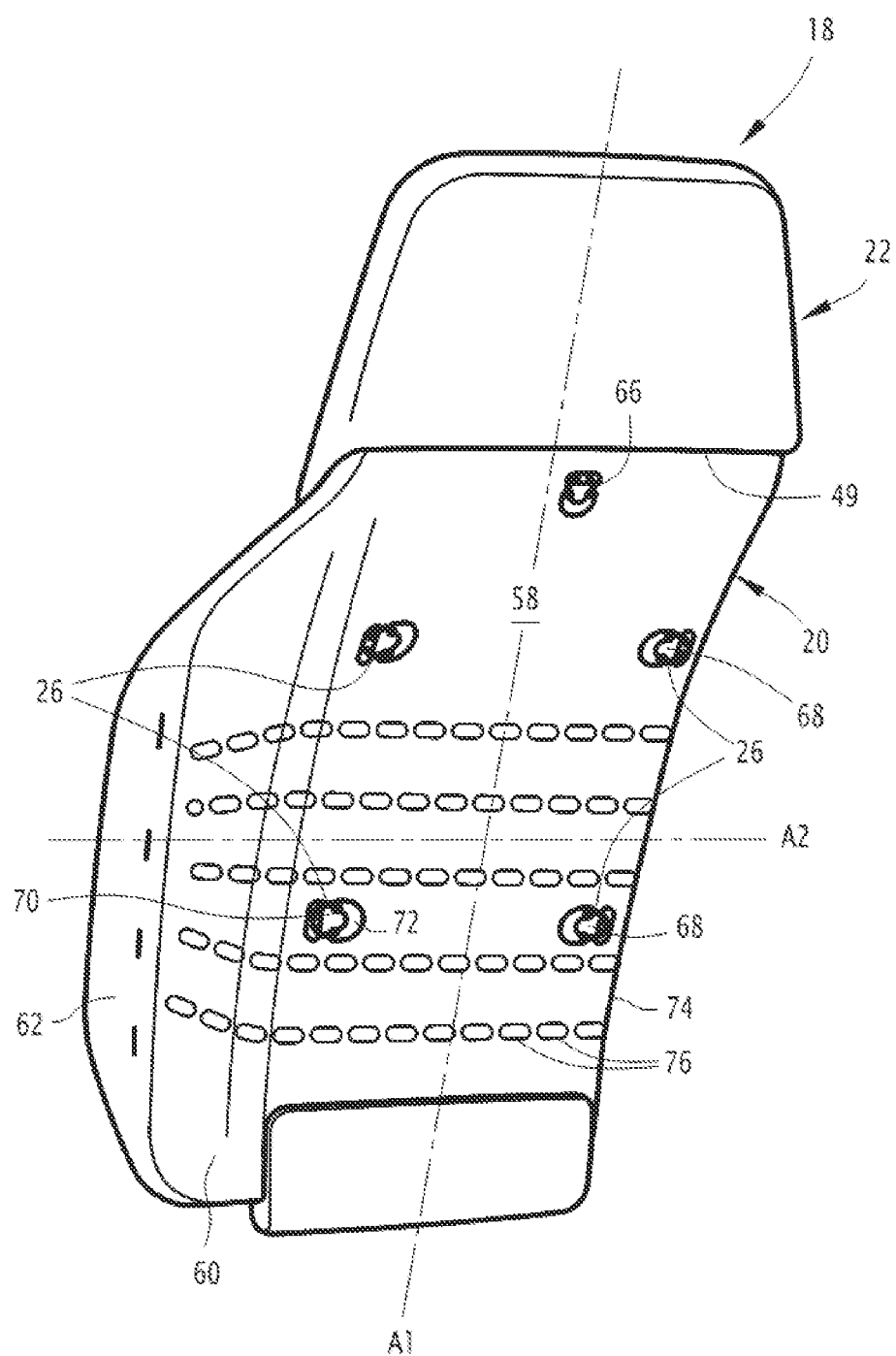

[Fig 4]
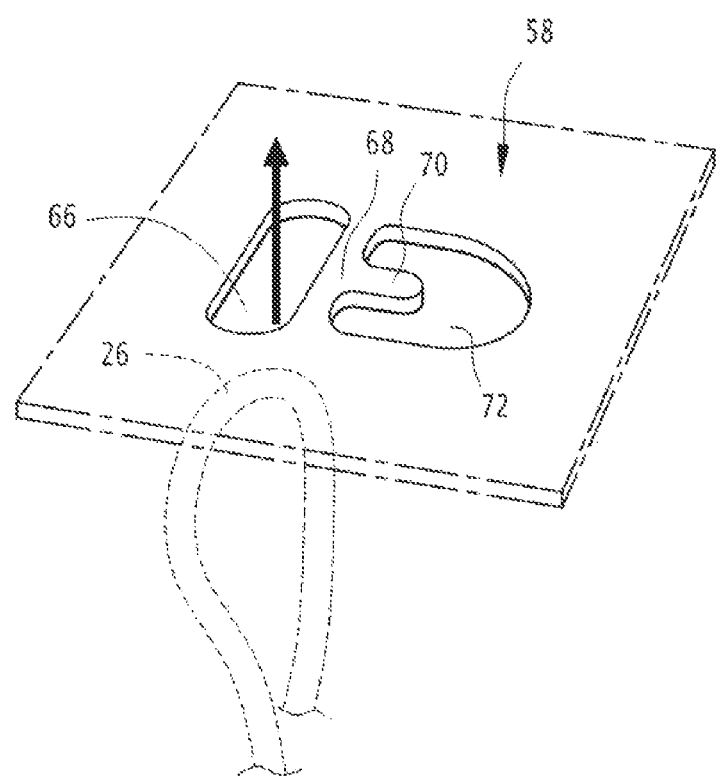

[Fig 5]
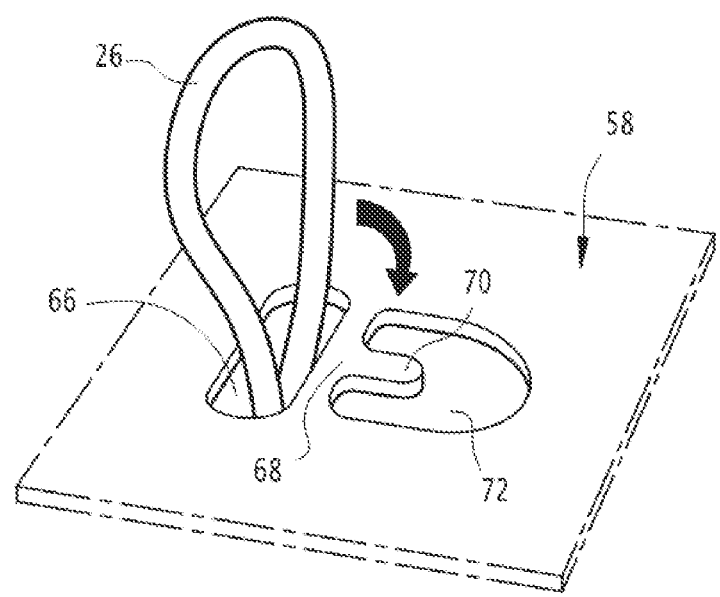

[Fig 6]
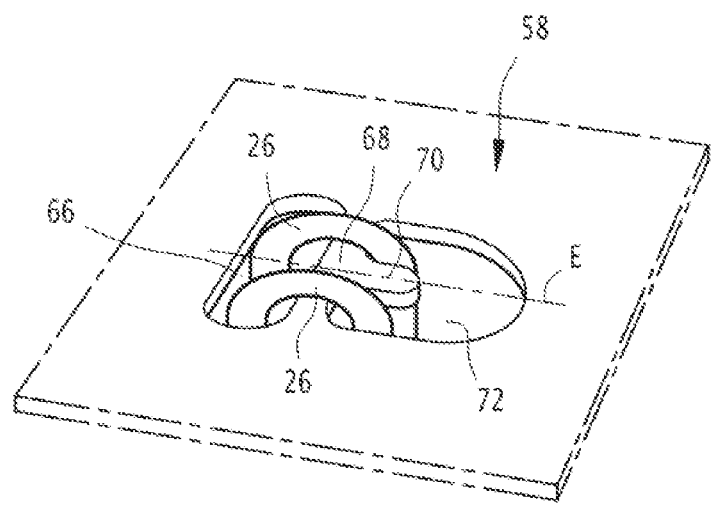

SUPPORT ELEMENT FOR A VEHICLE SEAT, ASSOCIATED VEHICLE SEAT AND ASSEMBLY METHOD

TECHNICAL FIELD

The present invention relates to a support element for a vehicle seat.

BACKGROUND

Producing a support element for a vehicle seat typically requires the cover to be fastened on the other elements of the seat. For example, a cover encloses padding and is held in place using zippers. Vehicle seats for which the cover is fastened on metal elements of the frame of the seat are also known. For this type of seat, the assembly operations are lengthy and tedious and require numerous additional parts to correctly position the cover. Replacement of the cover is also complex.

SUMMARY

One of the aims of the invention is to overcome these disadvantages by proposing a support element for a light vehicle seat, inexpensive, environmentally friendly and for which the cover is easy and quick to assemble and to disassemble.

Embodiments of the invention relate to a support element for a vehicle seat of the aforementioned type, wherein the cover comprises a plurality of fastening loops fastened on the rear surface of the cover, the shell comprising a plurality of through-openings arranged substantially facing the fastening loops, the fastening loops passing through said through-openings and mechanically cooperating with the shell so as to keep the cover rigidly connected to the shell.

The fastening loops make it possible to fasten the cover simply and quickly to the shell of the seat. Changing the cover is just as easy to implement. The support element is lightweight, easy, inexpensive to manufacture and environmentally friendly, since it only comprises a limited number of elements.

The support element may further comprise one or more of the following features, considered alone or according to any technically possible combinations:
the fastening loops are sewn onto the rear surface of the cover;
the padding defines at least one through-opening arranged substantially facing one of the fastening loops and one of the through-openings of the shell, said fastening loop passing through said through-opening of the padding,
the shell comprises a plurality of holding members, each fastening loop mechanically cooperating with a respective holding member;
each holding member is integral with the shell;
each holding member is formed by a protrusion defined by the shell;
a portion of the cover forms an envelope receiving one end of the shell and one end of the padding, and
the shell comprises a central part and two lateral parts arranged on either side of the central part, the cover and the padding covering the central part of the shell, the lateral parts each defining a free bearing surface.

Embodiments of the invention also relate to a vehicle seat comprising a support element as described above.

Embodiments of the invention further relate to a method for assembling a support element as described above, the method comprising the following steps:
placing the padding between the shell and the cover,
inserting the fastening loops through the through-openings of the shell,
making the fastening loops mechanically cooperate with the shell so as to keep the cover rigidly connected to the shell.

The description also relates to a support element for a vehicle seat, said support element comprising:
a shell comprising a central part and two lateral parts arranged on either side of the central part,
a cover mounted on the shell, the cover defining a bearing surface intended to receive a passenger,
a padding arranged between the shell and the cover, characterized in that the cover and the padding cover the central part of the shell, the lateral parts of the shell each defining a free bearing surface.

The support element may further comprise one or more of the following features, considered alone or according to any technically possible combinations:
the bearing surface of the cover and the bearing surfaces of the lateral parts of the shell together define a receiving cradle intended to receive a passenger;
the cover and the padding cover only a front surface of the central part of the shell;
the cover comprises a plurality of fastening loops fastened on a rear surface of the cover, the shell comprising a plurality of through-openings arranged substantially facing the fastening loops, the fastening loops passing through said through-openings and cooperating with the shell so as to keep the cover rigidly connected to the shell;
the fastening loops are sewn onto the inner surface of the cover;
the padding defines at least one through-opening arranged substantially facing one of the fastening loops and one of the through-openings of the shell, said fastening loop passing through said through-opening of the padding,
the shell comprises a plurality of holding members, each fastening loop cooperating with a respective holding member;
each holding member is integral with the shell;
each holding member is formed by a protrusion defined by the shell;
one end of the cover forms an envelope receiving one end of the shell and one end of the padding.

The description also describes a seat comprising a support element as described above.

The description also describes a method for assembling a support element as described above, the method comprising a step of placing the padding between the shell and the cover.

BRIEF DESCRIPTION OF THE DRAWINGS

Other aspects and advantages of the invention will become apparent on reading the following description, given by way of example and made with reference to the appended drawings in which:

FIG. 1 is a perspective view of a vehicle seat according to an embodiment of the invention, FIG. 2 is a perspective view of a support element of the seat of FIG. 1, FIG. 3 is an exploded view of the support element of FIG. 3, and FIGS. 4 to 6 are detailed views of three steps of a method for assembling the support element according to an embodiment of the invention.

DETAILED DESCRIPTION

With reference to FIG. 1, a vehicle seat 10 is described. The seat 10 is, for example, a land, sea or air vehicle seat. The seat 10 is, for example, a motor vehicle seat.

The seat 10 is intended to receive a passenger.

The seat 10 comprises a backrest 12 and a squab 14 and preferably a headrest 16 on the backrest 12. The headrest 16 is known per se from the prior art and is not described here.

The seat 10 comprises at least one support element 18.

In the example shown in FIGS. 1 to 3, the support element 18 forms the backrest 12 of the seat 10.

The support element 18 extends mainly substantially along a first axis A1. The support element 18 further extends along a second axis A2 substantially perpendicular to the first axis A1. When the seat 10 is in place in the vehicle, the first axis A1 is for example substantially coincident with an elevation direction or forms an angle of between 0° and 45° with the elevation direction. The second axis A2 is then substantially coincident with a transverse direction of the vehicle, itself substantially perpendicular to a longitudinal direction corresponding to the normal direction in which the vehicle advances.

In the rest of the description, the terms "upper" and "lower" will be used with reference to the first axis A1 of the support element 18, that is to say in the shown example, of the backrest 12, when the seat 10 is in place in the vehicle. An "upper" element is located above a "lower" element along the first axis A1.

Alternatively, the support element 18 forms the squab 14 of the seat 10. In another alternative, the seat 10 comprises a first support element forming the backrest 12 of the seat 10 and a second support element forming the squab 14 of the seat 10.

In the rest of the description, the adjective "front" refers to a surface oriented toward the passenger seated on the seat 10. Conversely, the term "rear" refers to a surface located opposite a surface called the "front", that is to say oriented away from the passenger.

The support element 18 comprises a shell 20, a cover 22 mounted on the shell 20, and a padding 24 arranged between the shell 20 and the cover 22. The cover 22 comprises a plurality of fastening loops 26.

The padding 24 defines a front surface 28 oriented toward the cover 22, and a rear surface 30, opposite the front surface 28 oriented toward the shell 20. The padding 24 further defines lateral edges 32 connecting the front surface 28 and the rear surface 30 of the padding 24. For example, the thickness of the padding 24 taken in a direction substantially perpendicular to the front surface 28 is between 5 cm and 35 cm.

The padding 24 is in contact with the cover 22 and the shell 20. More particularly, the front surface 28 of the padding 24 is in contact with a rear surface 34 of the cover 22. The rear surface 30 of the padding 24 is in contact with at least part of a front surface 36 of the shell 20.

The padding 24 is for example a foam body, preferably polyurethane foam. When the passenger uses the seat 10, he presses on the padding 24. The padding 24 gives the seat 10 its comfort qualities. The padding 24 is preferably made of one piece. The padding 24 is for example obtained by cutting into a panel. Alternatively, the padding 24 is obtained by molding.

According to a particular embodiment, the padding 24 comprises one or more through-openings 38 allowing the passage of the fastening loops 26, as described below. The through-opening(s) 38 are then arranged facing the fastening loops 26 of the cover 22 to allow the passage of the fastening loops 26 through the through-openings 38 of the padding 24. For example, each through-opening 38 is a slit made by an incision in the padding 24.

It is understood that, according to a particular embodiment, the padding 24 does not comprise through-openings 38. The fastening loops 26 are then for example arranged around the padding 24, without through-openings 38 being necessary in the padding 24.

The cover 22 defines a front surface 40 forming a bearing surface 42 intended to receive a passenger. The front surface 40 is arranged opposite the rear surface 34. The rear surface 34 of the cover 22 is in contact with the padding 24.

Preferably, the cover 22 forms a jacket enveloping at least part of the padding 24. In the shown example, the cover 22 comprises an upper portion 44, a lower portion 46 and an intermediate portion 48 connecting the upper portion 44 to the lower portion 46. The upper portion 44 defines an envelope 49 receiving an upper part 50 of the padding 24 and an upper part 52 of the shell 20 (FIG. 3). The intermediate portion 48 defines two lateral spaces 54 enveloping at least part of the lateral edges 32 of the padding 24. The lower portion 46 surrounds the padding 24 and a lower part 56 of the shell 20 along the second axis A2. The lower part 46 of the cover 22 is fastened on the shell 20 and in particular to a rear surface 58 of the shell 20.

Thus, the cover 22 is rigidly connected to the shell 20. The cover 22 also holds the padding 24 bearing against the shell 20 and prevents the padding 24 from moving relative to the shell 20 along the first axis A1 and/or the second axis A2.

The cover 22 is for example made of leather, fabric, synthetic or natural material or a mixture of these materials. The cover 22 provides its appearance to the support element 18. The cover 22 also contributes to protecting the padding 24.

The fastening loops 26 are attached onto the rear surface 34 of the cover 22. For example, the fastening loops 26 are sewn onto the rear surface 34 of the cover 22. Alternatively, the fastening loops 26 are glued onto the rear surface 34 of the cover 22.

In the example shown, the cover 22 comprises five fastening loops 26. It is understood that the cover 22 may comprise any number of fastening loops 26 distributed on the rear surface 34 of the cover 22. Preferably, the fastening loops 26 are fastened on the intermediate portion 48 of the cover 22, for example in one or more directions substantially parallel to the first axis A1, and/or along one or more directions substantially perpendicular to the first axis A1.

Each fastening loop 26 protrudes from the rear surface 34 of the cover 22 toward the padding 24 and the shell 20. For example, each fastening loop 26 is formed by a cord or a strip of fabric. Preferably, the fastening loop 26 is resilient, that is when a tensile force is exerted below a predetermined threshold, the fastening loop 26 deforms. If the traction force is no longer being exerted, the fastening loop 26 returns to its initial shape. Beyond the predetermined threshold, the fastening loop 26 breaks.

The shell 20 comprises at least one central part 60 arranged facing the padding 24. Advantageously, the shell 20 further comprises two lateral parts 62 arranged on either side of the central part 60 along substantially the second axis A2. The lateral parts 62 each define a free bearing surface 64 visible by the passenger. In other words, the cover 22 and the padding 24 do not conceal the lateral parts 62 of the shell 20. The cover 22 and the padding 24 cover only the central part 60 of the shell 20.

The bearing surfaces 64 of the lateral parts 62 and the free bearing surface 42 of the cover 22 form between them a receiving cradle intended to receive the passenger. In other words, the bearing surfaces 64 of the lateral parts 62 and the free bearing surface 42 of the cover 22 form between them a curved receiving surface of the passenger of concave shape.

The shell is rigid. For example, the shell is made of plastic material, for example by molding.

The shell 20 comprises a plurality of through-openings 66 arranged substantially facing the fastening loops 26. Each fastening loop 26 passes through a corresponding through-opening 66 and cooperates with the shell 20 so as to keep the cover 22 rigidly connected to the shell 20. The through-openings 66 have any shape, for example circular, ellipsoidal or rectangular.

Advantageously, the shell 20 comprises a plurality of holding members 68. Each fastening loop 26 mechanically cooperates with a corresponding holding member 68. Each holding member 68 extends for example mainly along an elongation axis E.

In the example shown, each holding member 68 is made of the same part as the shell 20. Each holding member 68 is for example formed by a protrusion 70 defined by the shell 20. In particular, the protrusion 70 is delimited by a part of an edge of the opening of a hole 72 in the shell 20. The hole 72 is preferably a through-hole, that is it passes through the shell 20 from the rear surface 58 of the shell 20 to the front surface 36 of the shell 20. Alternatively, the hole 72 is blind, that is it extends from the rear surface 58 of the shell 20 but does not open onto the front surface 36 of the shell 20. In the example shown, each protrusion 70 extends substantially in the plane wherein the opening extends. The protrusion 70 extends opposite the through-opening 66 of the corresponding shell 20.

In the example shown, each fastening loop 26 is arranged around a respective holding member 68. Each fastening loop 26 surrounds the holding member 68 along the elongation axis E.

Thus, attaching the fastening loops 26 to the shell 20 is simple, since no external element is required to attach the cover 22 to the shell 20.

Advantageously, the shell 20 comprises at least one deformation line 74, preferably a plurality of deformation lines 74. Each deformation line 74 extends in a direction of extension substantially parallel to the second axis A2. Each deformation line 74 comprises a plurality of perforations 76 aligned next to one another in the direction of extension. The perforations 76 pass through the shell 20 between the rear surface 58 and the front surface 36. The deformation lines 74 allow the shell 20 to deform, in particular when a passenger rests on the support element 18, which improves passenger comfort. In addition, the perforations 76 also allow the aeration of the support element 18, and especially to evacuate the heat generated by the passenger when they press on the support element 18.

A method for assembling a support element 18 as presented above will now be described.

First, the padding 24 is placed between the shell 20 and the cover 22. More particularly, the padding 24 is placed inside the cover 22. In particular, the upper part 44 of the cover 22 is placed on the upper part 50 of the padding 24.

The cover 22 and the padding 24 are then arranged facing the front surface 36 of the shell 20. In particular, the upper part 52 of the shell 20 is inserted inside the envelope 49 of the upper portion 44 of the cover 22. If necessary, as warranted, the fastening loops 26 are inserted through the through-openings 38 of the padding 24.

The fastening loops 26 are then inserted through the through-openings 66 of the shell 20 (FIG. 4) so that they protrude relative to the rear surface 58 of the shell 20 (FIG. 5).

The fastening loops 26 are then mechanically made to cooperate with the shell 20 so as to hold the cover 22 secured to the shell 20. In the example shown, each fastening loop 26 is arranged around a respective holding member 68 (FIG. 6).

Preferably, the lower portion 46 of the cover 22 is then folded back towards the rear so as to surround a lower edge of the padding 24 and the shell 20, then fastened on the rear surface 58 of the shell 20.

Disassembling the cover 22 is easy, since it is sufficient to remove each of the fastening loops 26 from its respective holding member 68 and to detach the lower portion 46 from the cover 22 of the shell 20. The cover 22 can then be separated from the shell 20 and padding 24 and for example replaced.

According to another embodiment not shown, the holding member 68 is a hook extending protruding from the rear surface 58 of the shell 20.

Alternatively, according to another embodiment not shown, the shell 20 does not comprise holding members 68. Each fastening loop 26 cooperates directly with the rear surface 58 of the shell 20. For example, a knot is formed with each of the fastening loops 26. Each knot has a dimension greater than at least one dimension of the through-opening 66 of the shell 20. The knot is then supported against at least one part of the edge of the through-opening 66. Also alternatively, the support element 18 comprises a plurality of locking members, for example a plurality of rods. Each locking member is arranged through an fastening loop 26 and bearing against the rear surface 58 of the shell 20.

Also alternatively to the embodiments presented above, the cover 22 covers only the front surface 28 of the padding 24. The fastening loops 26 are fastened on a periphery of the cover 22, for example at a free edge of the cover 22.

The support element 18 is particularly advantageous. Indeed, the fastening loops 26 make it possible to fasten the cover 22 simply and quickly to the shell 20. Changing the cover 22 is just as easy to implement. The support element 18 is lightweight, easy, inexpensive to manufacture and environmentally friendly, since it only comprises a limited number of elements.

The invention claimed is:

1. A support element for a vehicle seat, said support element comprising:
   a shell,
   a cover mounted on the shell, the cover defining a front surface forming a bearing surface for receiving a passenger, and a rear surface opposite the front surface, and
   a padding arranged between the shell and the cover,
   wherein the cover comprises a plurality of fastening loops fastened on the rear surface of the cover, the shell comprising a plurality of through-openings arranged substantially facing the fastening loops, the fastening loops passing through said through-openings and mechanically cooperating with the shell so as to keep the cover rigidly connected to the shell, wherein the shell comprises a plurality of holding members, each fastening loop mechanically cooperating with a respective holding member, and wherein each holding member is made of the same part as the shell.

2. The support element according to claim 1, wherein the fastening loops are sewn on the rear surface of the cover.

3. The support element according to claim 1, wherein the padding defines at least one through-opening arranged substantially facing one of the fastening loops and one of the through-openings of the shell, said fastening loop passing through said through-opening of the padding.

4. The support element according to claim 1, wherein each holding member is formed by a protrusion defined by the shell.

5. The support element according to claim 1, wherein a portion of the cover forms an envelope receiving one end of the shell and one end of the padding.

6. The support element according to claim 1, wherein the shell comprises a central part and two lateral parts arranged on either side of the central part, the cover and the padding covering the central part of the shell, the lateral parts each defining a free bearing surface.

7. A vehicle seat comprising at least one support element according to claim 1.

8. A method for assembling the support element according to claim 1, the method comprising the following steps:
   placing the padding between the shell and the cover,
   inserting the fastening loops through the through-openings of the shell, and
   making the fastening loops mechanically cooperate with the shell so as to keep the cover rigidly connected to the shell.

9. A support element for a vehicle seat, said support element comprising:
   a shell,
   a cover mounted on the shell, the cover defining a front surface forming a bearing surface for receiving a passenger, and a rear surface opposite the front surface, and
   a padding arranged between the shell and the cover,
   wherein the cover comprises a plurality of fastening loops fastened on the rear surface of the cover, the shell comprising a plurality of through-openings arranged substantially facing the fastening loops, the fastening loops passing through said through-openings and mechanically cooperating with the shell so as to keep the cover rigidly connected to the shell,
   wherein the shell comprises a plurality of holding members, each fastening loop mechanically cooperating with a respective holding member, and
   wherein each holding member is formed by a protrusion defined by the shell.

10. The support element according to claim 9, wherein the fastening loops are sewn on the rear surface of the cover.

11. The support element according to claim 9, wherein the padding defines at least one through-opening arranged substantially facing one of the fastening loops and one of the through-openings of the shell, said fastening loop passing through said through-opening of the padding.

12. The support element according to claim 9, wherein a portion of the cover forms an envelope receiving one end of the shell and one end of the padding.

13. The support element according to claim 9, wherein the shell comprises a central part and two lateral parts arranged on either side of the central part, the cover and the padding covering the central part of the shell, the lateral parts each defining a free bearing surface.

14. A vehicle seat comprising at least one support element according to claim 9.

15. A method for assembling the support element according to claim 9, the method comprising the following steps:
   placing the padding between the shell and the cover,
   inserting the fastening loops through the through-openings of the shell, and
   making the fastening loops mechanically cooperate with the shell so as to keep the cover rigidly connected to the shell.

* * * * *